(12) United States Patent
Wigzell

(10) Patent No.: US 7,805,355 B2
(45) Date of Patent: Sep. 28, 2010

(54) GRAPHICAL USER INTERFACE TO FACILITATE RAPID AND RELIABLE ELECTRONIC TRADING ASSESSMENT AND EXECUTION

(75) Inventor: Simon Wigzell, Stockholm (SE)

(73) Assignee: ORC Software AB, Stockholm (SE)

( * ) Notice: Subject to any disclaimer, the term of this patent is extended or adjusted under 35 U.S.C. 154(b) by 1162 days.

(21) Appl. No.: 11/302,319

(22) Filed: Dec. 14, 2005

(65) Prior Publication Data

US 2006/0155626 A1 Jul. 13, 2006

Related U.S. Application Data

(60) Provisional application No. 60/635,981, filed on Dec. 15, 2004, provisional application No. 60/715,599, filed on Sep. 12, 2005.

(51) Int. Cl.
*G06Q 40/00* (2006.01)
(52) U.S. Cl. .................................................. 705/37
(58) Field of Classification Search .............. None
See application file for complete search history.

(56) References Cited

U.S. PATENT DOCUMENTS

| | | | |
|---|---|---|---|
| 6,523,022 B1 * | 2/2003 | Hobbs .......................... 707/3 |
| 6,766,304 B2 | 7/2004 | Kemp, II et al. |
| 6,772,132 B1 | 8/2004 | Kemp, II et al. |
| 7,127,424 B2 | 10/2006 | Kemp et al. |
| 7,177,833 B1 | 2/2007 | Marynowski et al. |
| 7,228,289 B2 * | 6/2007 | Brumfield et al. ............. 705/35 |
| 2003/0097640 A1 * | 5/2003 | Abrams et al. ............... 715/530 |
| 2003/0135842 A1 * | 7/2003 | Frey et al. .................... 717/121 |
| 2003/0154158 A1 | 8/2003 | Martyn et al. |
| 2003/0236737 A1 * | 12/2003 | Kemp et al. ................... 705/37 |
| 2004/0103054 A1 * | 5/2004 | Singer ........................ 705/37 |
| 2004/0133500 A1 * | 7/2004 | Thompson et al. ............. 705/37 |
| 2005/0108653 A1 | 5/2005 | Langridge |
| 2005/0125328 A1 * | 6/2005 | Schluetter ..................... 705/37 |
| 2005/0192887 A1 * | 9/2005 | Triplett ........................ 705/37 |
| 2005/0262003 A1 | 11/2005 | Brumfield et al. |
| 2006/0010066 A1 * | 1/2006 | Rosenthal et al. ............. 705/37 |
| 2006/0037038 A1 | 2/2006 | Buck |
| 2006/0129475 A1 | 6/2006 | Badenhorst et al. |
| 2006/0259417 A1 | 11/2006 | Marynowski et al. |

OTHER PUBLICATIONS

U.S. Appl. No. 11/302,497, filed Dec. 14, 2005; Inventor: Wigzell.
Office Action mailed Aug. 7, 2008 in co-pending U.S. Appl. No. 11/302,319.

* cited by examiner

*Primary Examiner*—Alexander Kalinowski
*Assistant Examiner*—Bruce I. Ebersman
(74) *Attorney, Agent, or Firm*—Nixon & Vanderhye P.C.

(57) ABSTRACT

An electronic trading user interface allows a trader to react to market conditions very quickly in order to give the trader an improved probability of trading at a desired price and volume. The electronic order process is made faster, more efficient, and more reliable. The construction and sending of orders may be performed using a simple "click" of a mouse or other input device. The current market data is presented dynamically and in a user-friendly way to allow a trader to quickly assess the current market situation, including the trader's own orders, and to send orders quickly and reliably. Different embodiments are presented that ensure that the trader sends the order at the price intended, which is particularly desirable when the market is moving simultaneously or very close in time with when the trader is selecting and placing an order.

25 Claims, 10 Drawing Sheets

| Last | High | Low | Close |
|---|---|---|---|
| 10.08 | 350.00 | 9.95 | 10.00 |
| Volume | Price | Price | Volume |
| 2,100 | 10.07 | 10.08 | 1,200 |
| 2,100 | 10.06 | 10.09 | 1,600 |
| 600 | 10.05 | 10.10 | 4,800 |
| 400 | 10.04 | 10.11 | 2,400 |
| 400 | 10.03 | 10.12 | 2,700 |
| 2,100 | 10.02 | 10.13 | 900 |
| 1,200 | 10.01 | 10.14 | 3,600 |
| 7,200 | 10.00 | 10.15 | 3,300 |
| 1,200 | 9.99 | | |
| 5,600 | 9.98 | | |
| 3,500 | 9.97 | | |
| 35,500 | 9.96 | | |

*Fig. 1*

Fig. 2  Overview of electronic market communication.

Fig. 3 Trading application with a multiple market setup.

Fig. 5

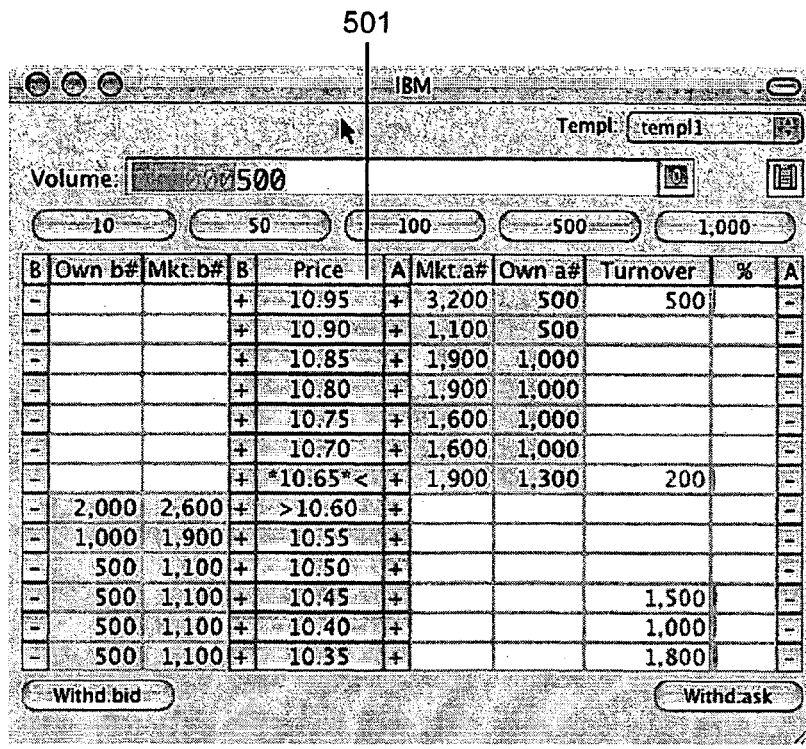
*Fig. 6* Dynamic Depth Order Display - the price column has dynamically moved to new best price levels.
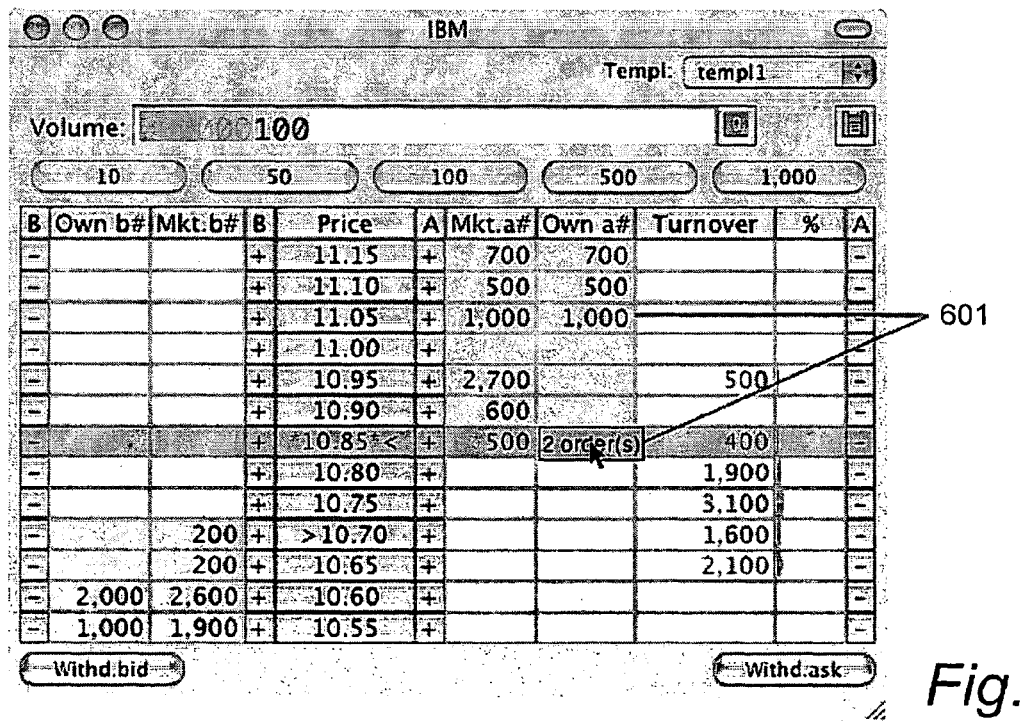
*Fig. 8*

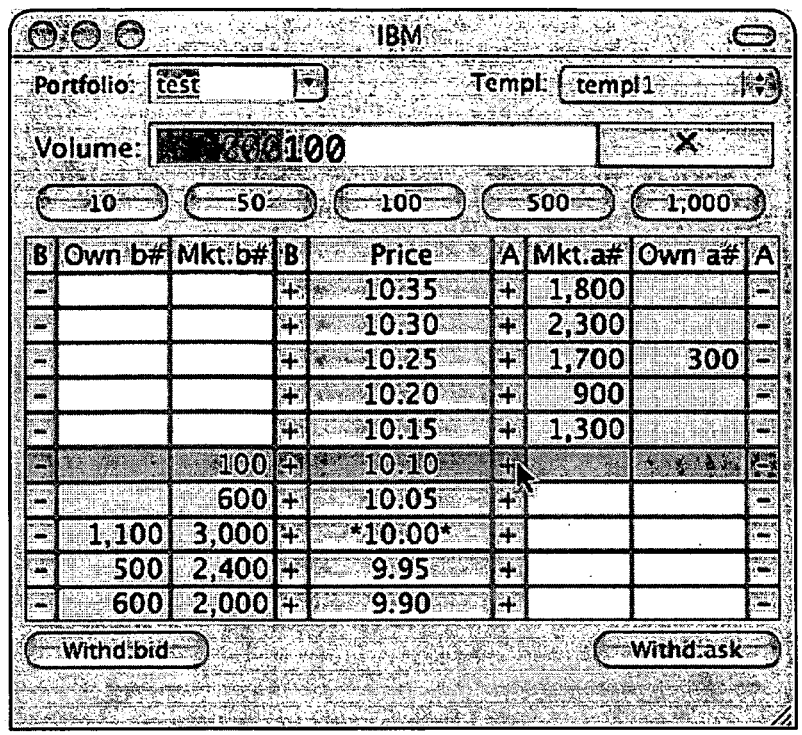
*Fig. 9*  Freezing a row, before market movement.
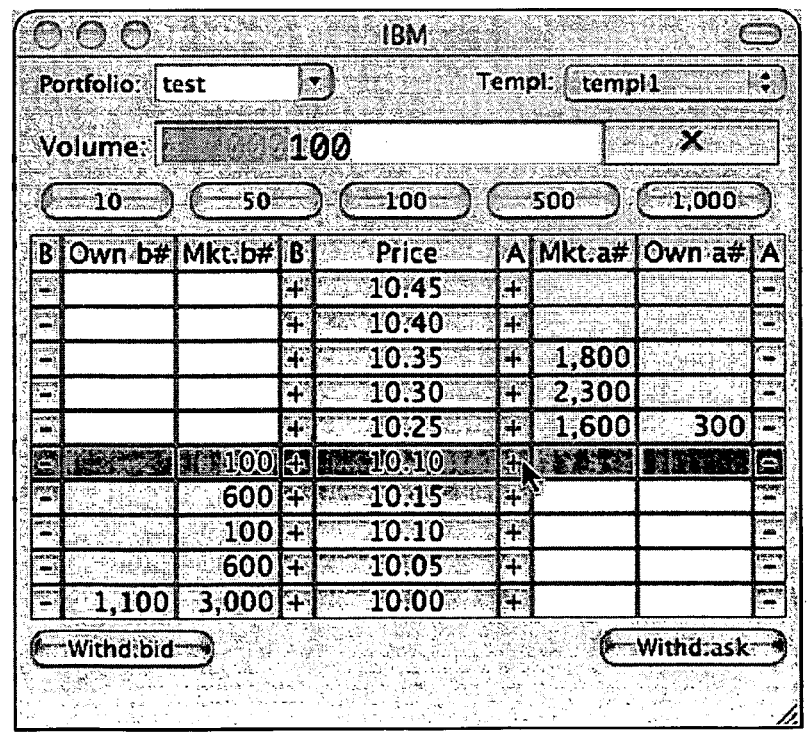
*Fig. 10*  Freezing a row, after market movement.

GRAPHICAL USER INTERFACE TO FACILITATE RAPID AND RELIABLE ELECTRONIC TRADING ASSESSMENT AND EXECUTION

RELATED APPLICATIONS

This application is related to and claims priority from U.S. provisional patent application Ser. No. 60/635,981, filed on Dec. 15, 2004, and U.S. provisional patent application Ser. No. 60/715,599, filed on Sep. 12, 2005, the contents of which are incorporated herein by reference.

TECHNICAL FIELD

The technical field relates to electronic trading of financial instruments, and in particular, to a user interface for allowing a user to obtain and view trading information and execute electronic trades of one or more financial instruments.

BACKGROUND

The market for trading financial instruments and other products is continuously developing. More market places around the world are converting to pure electronic trading. Furthermore, an increased portion of trading in financial instruments is taking place across national borders, since electronic trading greatly simplifies such practices. The technology described here provides a trader with a versatile and efficient tool for executing electronic trades of such financial instruments. It facilitates the display of and the rapid placement of trade orders within the market trading depth of a financial instrument. A financial instrument includes anything that can be traded with a quantity and/or price. Non-limiting examples of financial instruments include tangible and intangible products like stocks, bonds, options, futures, commodities, etc. The term financial instrument is therefore generic and inclusive.

When trading on an exchange, the "market depth" is part of the information available for the market. Market depth represents the "order book" for a financial instrument with current bid price (buy offer) and ask price (sell offer) and quantities in the market for that financial instrument. FIG. 1 shows a standard way of presenting market information. A display screen shows the price of the most recent trade for a financial instrument at the exchange, labeled as "Last" and indicated at 31, the highest price traded today for the financial instrument, labeled as "High" and indicated at 32, the lowest price traded today for the financial instrument, labeled as "Low" and indicated at 33, and the last price paid yesterday for the financial instrument, labeled as "Close" and indicated at 30.

The display includes a current market depth for bid orders for the financial instrument, with the best (highest) bid price presented at the top 35 and corresponding volumes 34 and the current market depth for ask orders, with the best (lowest) ask price at the top 36 and corresponding volumes 37. The number of levels available for display depends on what the exchange supports. Some provide the whole market depth for the financial instrument, and some just the top levels.

One area of interest is enabling fast input of trade orders to be sent to the exchange. The input of data in an order for a trade (e.g. price, volume, identifiers etc.) is the only manual, non-electronic, part of the process in sending an order to the market. This manual transaction time is the largest part of the total time it takes for an order to reach the market. On some markets, the prices for some financial instrument fluctuate often and with great speed. Thus, a slow order entry will put the trader at a significant disadvantage when there is an opportunity in the market. Further complicating order entries, there may be (depending on exchange rules) additional data that must be entered with an order (e.g., volume, the item being traded, etc.). Also, the information about the current market situation must be presented in a way that enables the trader to quickly see what is happening and react accordingly.

Although speed is an issue, accuracy is also important. The user interface for traders must allow the trader to quickly and accurately assess the market for a financial instrument and provide an order entry system that makes it very easy for the trader to place a trade and know that the trade placed is in fact what the trader intended. In addition to ensuring that the trader can simply select the correct quantity and price for a trade for a financial instrument, the trader should be able to know that the trade is still viable. In a fast moving market, the best bid/offer may have changed between the time when the trader decided to place a bid or an offer and when the physical trade actually is entered.

Given at least these factors just described, simplifying, speeding up, and making more reliable inputting order data, sending orders, and presenting market information would be of great value to traders.

SUMMARY

A user interface for electronic trading allows a trader to react to market conditions very quickly in order to give the trader an improved probability of trading at a desired price and volume. As a result, the electronic order process is made faster, more efficient, and more reliable. Constructing and sending orders may be performed using a simple "click" of a mouse or other input device. Current market data is presented dynamically in such a way that the trader can quickly see what is going on in the market for a particular financial instrument. The display allows a trader to quickly assess the current market situation, including the trader's own orders, and to send orders in a quick and efficient way. Both a "frozen row" embodiment and a moving trading panel/moving trading price embodiment ensure that the trader sends the order at the price intended, which is particularly desirable when the market is moving simultaneously or very close in time with when the trader is selecting and placing an order. Both embodiments are example and non-limiting embodiments.

A trade order for a financial instrument is placed on an electronic exchange using a graphical user interface that includes a display screen and a user input device that allows the user to interact with the display screen. A market depth of the financial instrument is displayed using a display of market bids in the market for the financial instrument, a display of market asks in the market for the financial instrument, and a display of prices in the market for the financial instrument. The price display is interposed between the bid display and the ask display. A user may use the user input device to enter a trade command by selecting a region of one of the displays and actuating the user device to enter an order for the financial instrument at a volume and price displayed in or associated with that region. The display moves with changes in the market for the financial instrument. The bid display, ask display, and price display have a different display characteristic to facilitate visual distinction, and wherein the best price is highlighted on the display.

In the frozen row embodiment, movement of the selected region of the displays is temporarily frozen as long as the selected region remains selected, even though a market change causes unselected portions of the dynamic displays to move. If a region of the dynamic display is not selected, then the dynamic bid, ask, and price displays move with changes in the market for the financial instrument. The display of quantity and price values associated with the selected region are maintained even though the market for the financial instrument may have changed. Entry of the trade command in the selected region results in sending an order at the maintained quantity and price value of the selected region, even though the market for the financial instrument may have changed.

In the moving trading panel/moving price display embodiment, a trade order for a financial instrument on an electronic exchange is entered using a graphical user interface that includes a display screen and a user input device that allows the user to interact with the display screen and a trading panel displayed on the display screen. The trading panel displays a market depth of the financial instrument with a display of bids, asks, and prices in the market for the financial instrument. A user may use the user input device to enter a trade command by selecting a region of one of the displays in the trading panel and actuating the user device to enter an order for the financial instrument at a volume and price displayed in or associated with that region of the trading panel. The displays in the trading panel move with a change in the market for the financial instrument. The trading panel moves to a different position on the display screen with the change in the market for the financial instrument.

The trading panel is located at a first position in the display screen so that at least some of the displayed prices in the market for the financial instrument remain at a same position on the display screen as a result of moving the trading panel to the different position on the display screen with the change in the market. The displayed prices in the market also move inside the trading panel with the change in the market. Along with the displayed prices, at least some of the displayed asks and bids in the market for the financial instrument preferably also remain at a same position on the display screen as a result of moving the trading panel to the different position on the display screen with the change in the market.

The trading panel may include a trading window and a trading table within the trading window. Moving the trading panel includes moving both the trading window and the trading table. Alternatively, the trading panel may include a trading window and a trading table within the trading window. Moving the trading panel includes moving the trading table within the trading window.

The entered order is a buy order if the position of the selected region at the time of actuation is within a bid order entry region and wherein the entered order is a sell order if the selected region at the time of actuation is within an ask order entry region. A side switch indicator at a price level on one of the bid and ask dynamic displays may be displayed, which when selected and actuated by the user device, causes a selected user trade order to be switched to the price level on the other of the bid and ask dynamic displays.

Another order entry feature allows rapid changing of an order. A region in the dynamic display is selected using the user device to configure a first trade order at a first price. The first trade order is moved using the user device to a different display region associated with a second price to configure a second trade order and the second trade order is entered. The user device can for example be a mouse. In that case, the selecting includes using a mouse to point to the selected region, the configuring includes clicking the mouse at the selected region, and the moving and entering are performing by dragging the first trade order to the different display region and unclicking the mouse.

Another order changing feature allows the user to withdraw all bid orders by selecting, using the user device, an area of the display configured as a withdraw bid region, and actuating the user device. All ask orders can be withdrawn by selecting using the user device an area of the display configured as a withdraw ask region and actuating the user device. Yet another trading feature provides a template display region permitting selection of a template using by the user device. Information in the order based on the selected template is automatically included.

BRIEF DESCRIPTION OF THE DRAWINGS

FIG. 1 illustrates a typical screen display showing the market depth of a financial instrument being traded;

FIG. 5 is a screen shot with an example of a dynamic depth order display;

FIG. 6 is a screen shot with an example of a dynamic depth order display where the price column has dynamically moved to a new best price level;

FIG. 8 is a screen shot with an example of a dynamic depth order display where there have been move orders in the depth;

FIG. 9 is a screen shot with an example of a dynamic depth order display where a selected row is frozen before market movement;

FIG. 10 is a screen shot with an example of a dynamic depth order display where a selected row is frozen after market movement;

DETAILED DESCRIPTION

Figure 2:
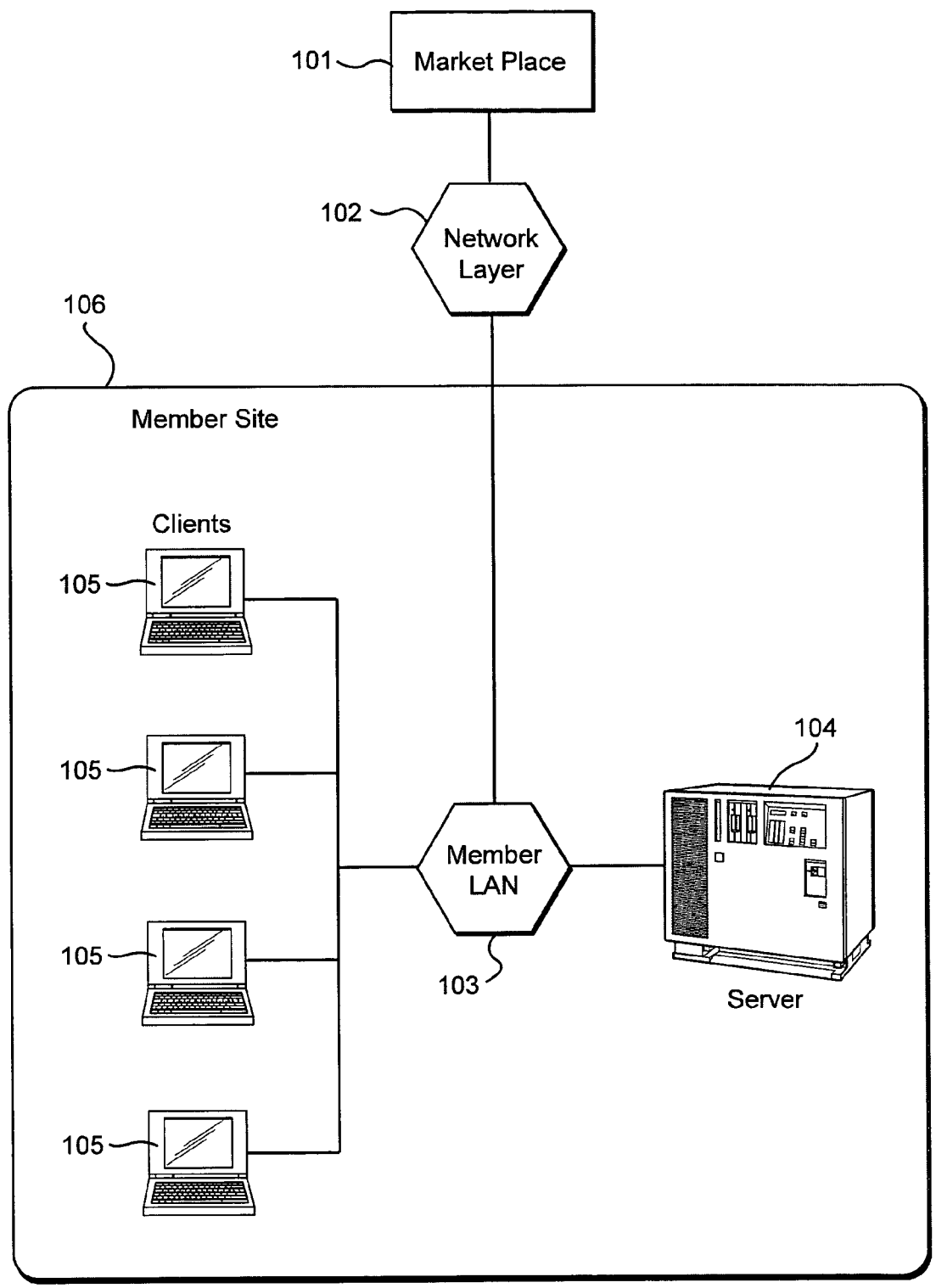
FIG. 2 is a diagram showing an example electronic market.

The detailed description describes a non-limiting example of a graphical user interface that provides a trader with improved efficiency and versatility in placing trade orders for financial instruments in an electronic exchange. Other features and advantages of this technology will become apparent to those skilled in the art from the following detailed description. It should be understood, however, that the detailed description and specific examples, while indicating preferred embodiments, are given by way of illustration and not limitation. Many changes and modifications within the scope of the present invention may be made without departing from the spirit thereof the invention, and the invention includes all such modifications.

In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudo-code, and the like represent various processes which may be substantially represented in computer readable medium and so executed by a computer or processor, whether or not such computer or processor is explicitly shown.

The functions of the various elements including functional blocks labeled as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

In a preferred example embodiment, the trading interface is implemented using a computer or other electronic terminal sometimes referred to as a client. Any existing or future terminal, device, or user interface with the capability to perform the functions described may be used. The client is able to communicate either directly or indirectly (using intermediate devices) with one or more exchanges to receive and transmit market and trading order information. The user interface supported by the computer allows the trader to define the content and characteristics of a trade order to be sent to the exchange.

A market place includes one or multiple markets or exchanges. A trader can, for example, be connected to multiple market places at the same time, as in FIG. 3 described below, and the merged data of the market places can then be presented in a single display. By "single click," a simple user interaction is intended using any type of user input device. For example, a single click might be a mouse click, a double-click, or any action undertaken by the trader in a short time span. The input device is not limited to a mouse. Market depth can be displayed on a vertical or horizontal plane, which fluctuates logically up or down, left or right across the plane as the market prices fluctuates. Again, market depth is the current bid and ask prices and quantities in the market for a financial instrument. The "inside market" is the highest bid price and lowest ask price for that financial instrument.

Different electronic market places vary greatly in what features an electronic market place provides and what possibilities a trader or other participant has to interact with that market place. However, a few things are present in most electronic market places since they are either necessary or desirable for trading financial instruments. FIG. 2 shows a simplified diagram of an example electronic market place. A host market place exchange 101 is responsible for sending and receiving information about prices, quantities, and availability of financial instruments to trade. Optionally, this exchange can also match prospective buyers with sellers, take care of accounting associated with executed trades or other transactions, etc. A market place exchange 101 is realized as one or more software processes running on a server to which exchange members like member site 106 can connect.

An exchange member site 106 includes one or more client computers 105 that can connect to the market place exchange 101 over a network 102 using for example the Internet, a member local area network (LAN), specially designated data lines, etc. Often all the clients 105 are interconnected via a local area network 103 to a member server 104 that manages the communications between client computers and the market place exchange 101.

For an exchange member to trade on the market place exchange, the market place exchange may itself provide an electronic trading program application, which is in direct contact with the market place exchange. This makes it simple for exchange members to take part in trading. Such an exchange application usually provides the mechanism needed to perform various functions relevant to trading on that specific market place exchange. But the exchange application does not connect to other market place exchanges.

Figure 3:
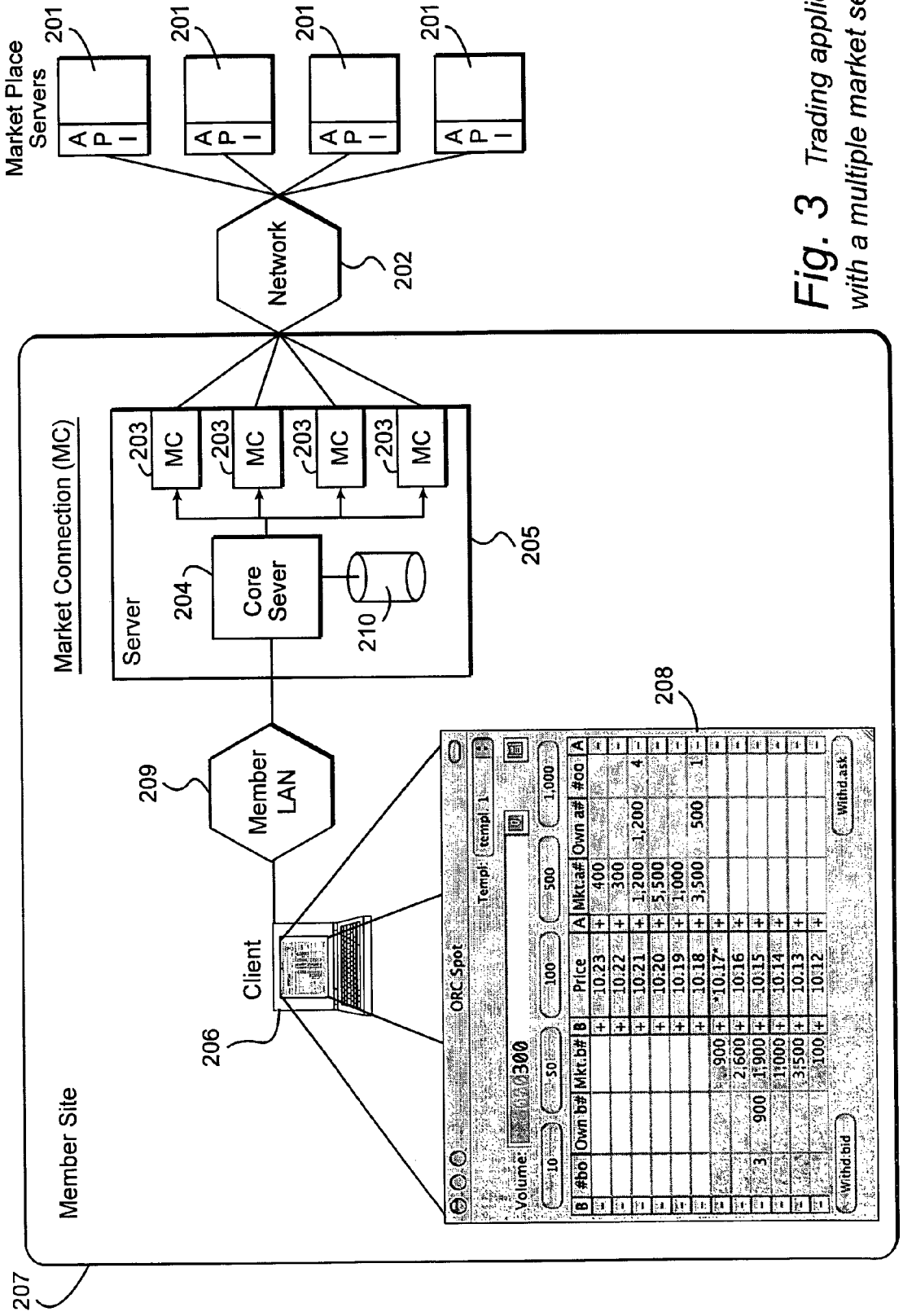
FIG. 3 is a diagram showing an example electronic market where the member site is coupled to multiple market places.

But having an exchange-supplied trading application is not always the best solution. It is often desirable to configure client computers to permit trading on multiple markets at the same time and to be able to use other trading strategies than those provided by a single market place exchange application. Therefore, there is a strong demand for trading applications that have greater capabilities. To this end, FIG. 3 illustrates an example electronic market where the member site is coupled to multiple market places.

A market place exchange member site 207 can connect to multiple market places 201 simultaneously over a network 202 or via market connections 203 dedicated to specific markets. Each market place connection (MC) 203 is a software program or process that communicates with a corresponding but different market place exchange 201 via the network 202. Each of those different market place exchanges 201 provides an application programming interface (API) to make it possible for software programs, like 203 for example, to access the market place to receive information and send orders. The market place connection 203 process executes on the member server 205 and connects to a market place exchange 201 server using an appropriate communications protocol, for example, the well known network protocol TCP/IP, in order to send and receive information electronically.

The member server 205 includes a core server 204 that coordinates information communicated between the trading application 208 (represented as a trading display screen or window in the figure) on the member's client computer 206 and the market place exchanges 201 and stores all essential business information in a database 210. The core server 204 allows the client to connect to one server to access multiple market places 201 and using one API. Alternatively, access could be made via different APIs used in the market servers 201. But if there are multiple clients or multiple types of clients, it is helpful if they can all use the same API, particularly when it comes to developing custom-built clients. Often, the core server 204, market connections 203, and the database 210 reside on the same physical server machine 205.

The client computer 206 connects to the core server 204 over a local area network 209 and can send orders and receive market information when a connection to a desired market place exchange 201 is established by its corresponding market connection 203. The trading application window 208 running on the client computer 206 displays information to the user that the user can act on. That information includes for example market data from the market places as well as information about the trader activity in the market.

The "Mkt.a#" and "Mkt.b#" columns in the trading application window 208 display the available volumes for ask and bid orders, respectively, of the selected financial instrument in the market place. This data is received from the market place. The asterisks encapsulating the price 10.17 corresponds to the last traded price for the financial instrument, information which is also received from the market place.

The "Own a#" and "Own b#" columns corresponds to own ask and bid orders for the financial instrument that the user has in the market place. This information is maintained and provided by the core server 204. Further description of the trading application window 208 is provided below.

Figure 4:
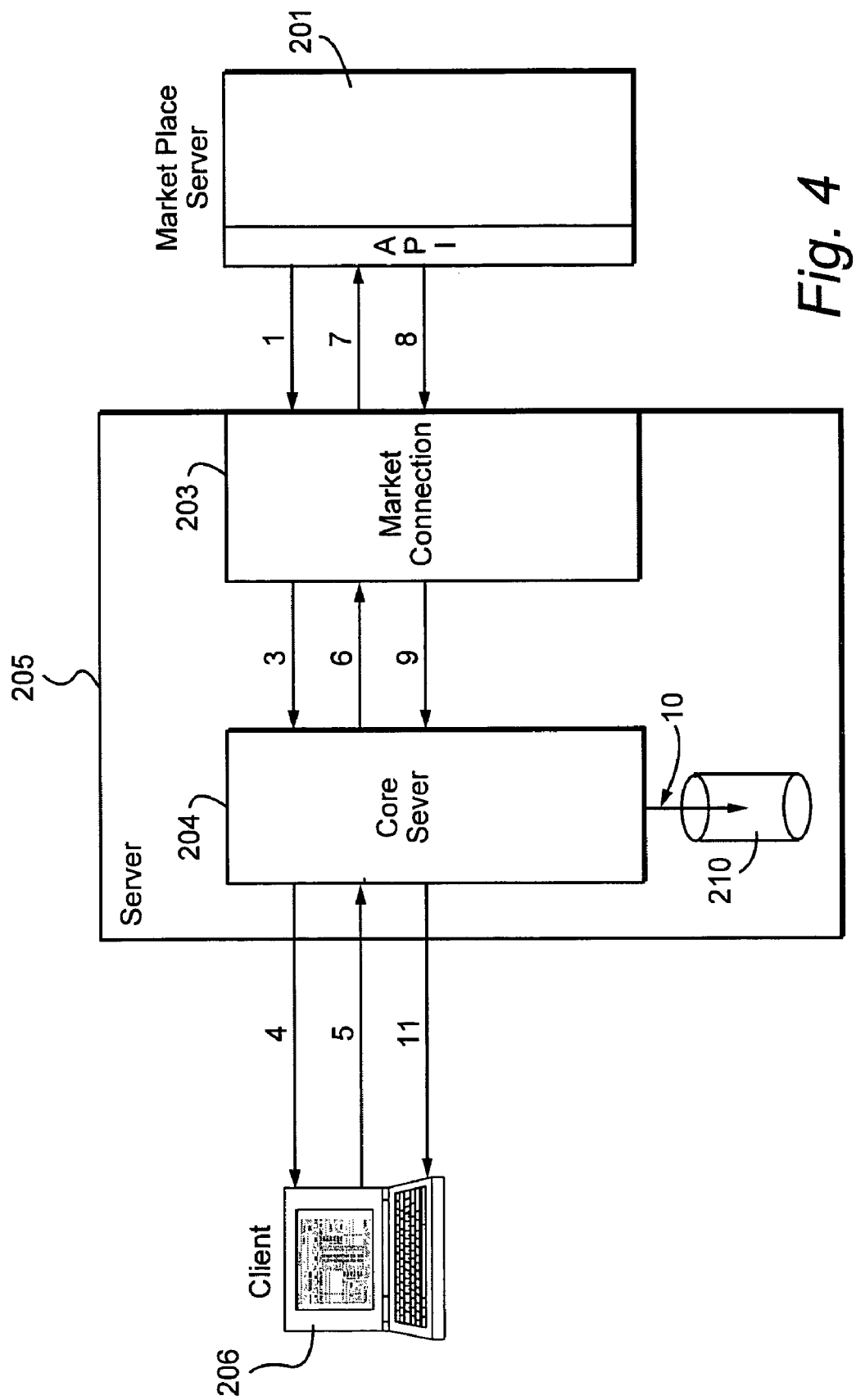
FIG. 4 is a diagram illustrating an example signal flow for information communicated in placing a trade order.

But now an example trade order procedure, illustrated using the numbered signal flows shown in FIG. 4, is described. The market place (realized as one or more server processes) disseminates market data information (1), which the market connection process monitors (2). This information is distributed via the core server (3) to the client computer (4). The market data information is displayed in a trading application window such as the window 208 shown in FIG. 3. The user can now act on this information and enter an order. The order is created locally on the client computer 206, and an order entry transaction is sent (5) via the core server 204 and to the appropriate market connection 203 at (6), where the selected market connection is decided either by order data set by the client computer 206 or by an algorithm in the core server 204.

The market connection 203 translates the order transaction into the format specified by the market place server API and then sends it to the market place server 201 at (7). The market place server 201 sends an acknowledgement of the transaction to the market connection notifying whether the order has entered the market place successfully (8). Assuming that the order entered the market place successfully, the market connection notifies the core server 204 at (9), which stores the order in the database 210 at (10). The core server 204 also sends this information to the trading application (11) running on the client computer 206 so the user receives an acknowledgement that the order has entered the market place.

Specific features of the trading application display are illustrated below using an example display screen. But these features are not limited to this particular display screen implementation or configuration. For example, although one or more dynamic displays on the screen might be configured to move in a particular direction to reflect the dynamics of the market place, other movement directions may be configured as well.

The display screen and response to user inputs, e.g., single clicks, are controlled by a suitably programmed computer terminal that can communicate either directly or indirectly using intermediate devices with one or more exchanges to receive and transmit market, financial instrument, and trading order information. The computer interacts with a trader via a display and an input device, which can be separate from the display like a mouse, keyboard, voice-activated director, etc. or can be integrated into the display like a touch screen. Trading can be conducted in a single or in multiple exchanges. For the latter situation, the trading terminal may be coupled with multiple exchanges as described above. Information from different exchanges can be displayed at one or in multiple windows at the client workstation 206. Accordingly, while reference may be made to a single exchange to which a trading terminal is connected, the inventive technology may be used to trade at multiple exchanges using a single trading terminal.

One aspect of this technology is an optimized user interface for displaying market depth data for a financial instrument. Market depth represents the "order book" with the current bid (buy) and ask (sell) prices and quantities for a financial instrument in the market that have not been filled. In other words, "market depth" refers to each bid and ask that was entered into the market in addition to the "inside market." For a financial instrument being traded, the "inside market" is the highest bid (buy) price and the lowest ask (sell) price.

The exchange sends the price, order, and fill information to each trader on the exchange. This information is processed and mapped to positions on the user display using any technique known to those skilled in the art, e.g., using a grid program or any other comparable mapping technique for mapping data to a screen. How much market depth is displayed depends on how much of the market depth the exchange provides. Some exchanges supply an infinite market depth, while others provide no market depth or only a few orders away from the inside market. The user can chose how far into the market depth to display on the screen.

A dynamic depth order display presents the market depth data in a compact, dynamic, and succinct way, and the data is consistently presented in a uniform way enabling better overview of relevant data, faster decision-making, and quick user action. The user gets all necessary data with a minimal number of actions to be able to react to market changes swiftly but also reliably. The dynamic depth order display allows the user to interact with the marketplace with a minimal number of actions thereby permitting swift reaction to market changes but with the assurance that trade orders correspond to what was intended. The user can send, withdraw, and/or modify orders with single clicks as well as apply certain data to the orders automatically.

Figure 5:
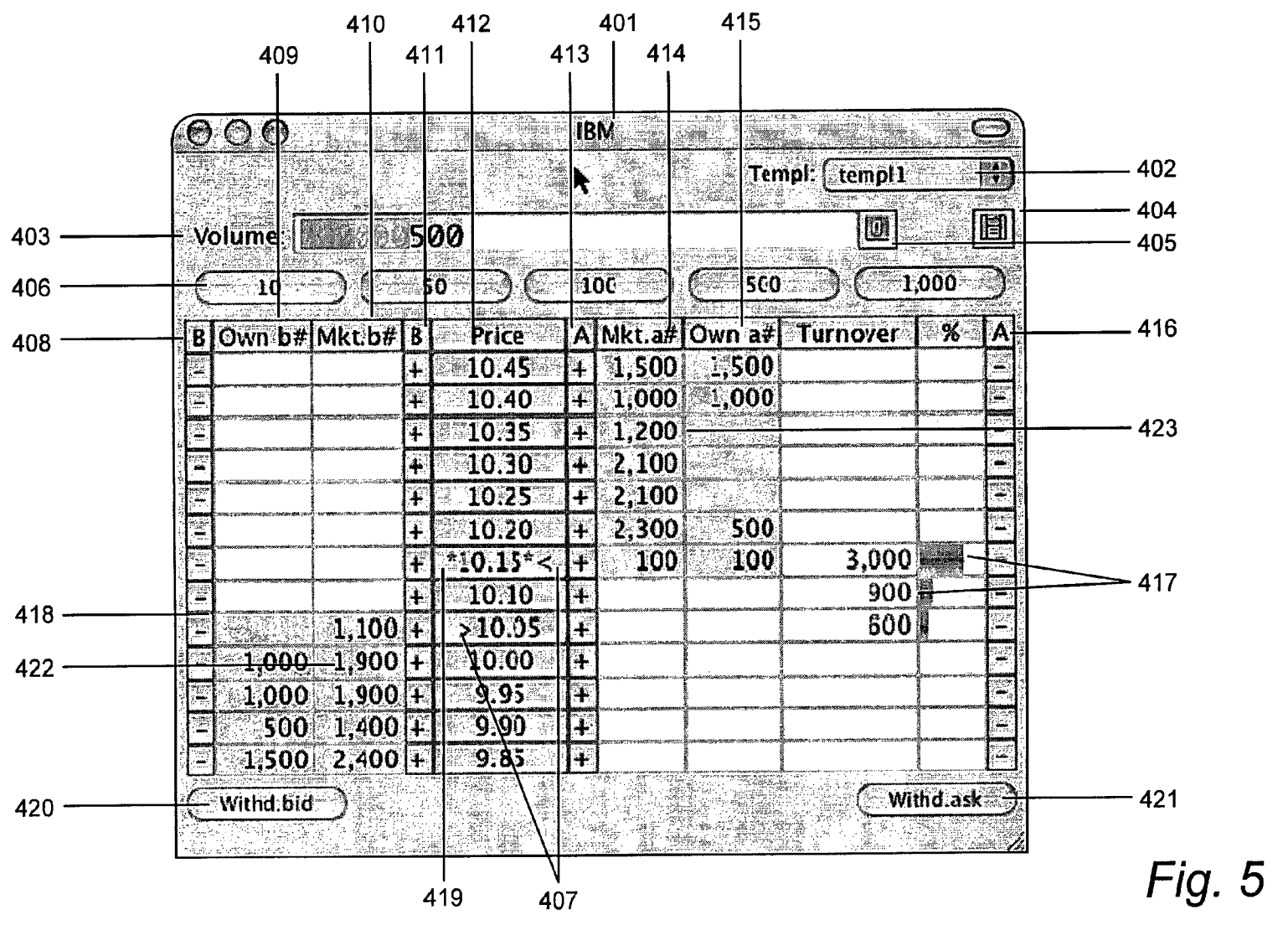

FIG. 5 shows an example, non-limiting implementation of a dynamic depth order display. The center portion of the display (moving horizontally across the display) in FIG. 5 includes a vertical price column 412, which shows the prices for each bid and ask for a financial instrument. All other columns in the display are aligned along this dynamic column. The price column shows the best bid and best offer in the middle or center of the price column. As the market moves, the price column changes automatically so the new best bid and best offer are located at the center of the price column. This automatic re-centering of the prices allows the trader to know where to look for the current inside market, and also ensures that the trader receives balanced information on both the sell and buy side of the inside market. The price "midpoint" can either be calculated as the average of the best bid and offer or it can be calculated with alternative midpoint determining algorithms. No matter how the midpoint is calculated, when the best bid and offer (i.e., the inside market) moves in the price column, the other columns aligned with the inside market move with the inside market.

In FIG. 6, the price column 501 is shown at a later time than in FIG. 5. At this later point in time, the best bid and offer prices have moved from 10.05 to 10.60 and 10.15 to 10.65, respectively. By making this price column move dynamically when the market moves, the trader can be certain that the most important information is always visible in the middle of the display since it is of utmost importance to see exactly where the current market best bid and offer price are.

This dynamic price display greatly simplifies and facilitates the use of the display. The trader always knows that the middle of the display shows the most interesting data. When speed is of the essence, a trader is mostly concerned with the best bid and offer prices since that is where things change most rapidly. Less important data is relegated towards the edges of the displayed trading window.

Columns 408 to 411 are bid columns presenting information about the buy side part of the market for this financial instrument and enabling the trader to base buy orders on that bid information. Column 408 "B" enables the trader to quickly withdraw all the buy orders the trader has at the market with the row price using a single click. Column 409

"OWN b#" shows the buy order volume that the trader has at the exchange with the row price. Column 410 "Mkt.b#" shows the total volume of all buy orders at the exchange with the row price. Column 411 "B" enables the trader to send a buy order with the price for the row using a single click. Columns 413 to 416 are all ask or offer columns presenting the same data on the sell side and enabling the same actions as columns 408 to 411 did for the bid side but with the opposite sell side. The actions available in these columns 413-416 are described below.

Another feature that enables quick actions and easy-read information is color indication for best price. For the line marked 418, all values in bid information columns belonging to rows with price equal to or lower than the current best bid price preferably have a different background color to enable the trader looking at a column far from the price column to quickly see where the inside market currently is. In the same way, all values in offer information columns belonging to rows with price equal to or higher than the current best offer price preferably use the same or a different background color. The color is not critical. Rather, the point is to have some distinctive display characteristic to indicate whether a cell belongs to a price, i.e., is on the same row as the price.

Two columns, "Turnover" and "%", (indicated at 417), display the traded volume at each price level. The turnover is not intended for trades executed for an entire day, but rather for a shorter, most recent time period. In this way, the data presented is confined to that which is most interesting for the trader and hence enables quicker decision making. The time instance is configurable so that the user can choose how far back in time the trader wants information displayed. Thus, the "Turnover" column displays the traded volume for the last "X" minutes (X is a configurable number) at that price level. This allows the trader to see the total activity in the market at each price level for the last "X" minutes for this financial instrument.

The "%" column displays the traded volume at each price level in relation to the total traded volume for the last "X" minutes. The "%" column may be displayed as a percentage bar, allowing for the user to quickly see what happens at each price level in relation to all other price levels. In cell 419, the price is bordered by asterisks to indicate that this is the price for the last trade. This enables the trader to quickly see the most recent price.

A number of features enhance the speed of user interaction with the trading screen. One is the ability to automatically assign data to orders with templates. The template popup 402 is populated with the available order templates for the selected financial instrument, enabling the trader to automatically add predefined additional data to orders before they are sent to market. This speeds up the time for the user to send an order to the market, since all extra data that needs to be included with the order can be retrieved with a single mouse click from a predefined template. After a template has been selected, this data is automatically included with each order sent to the exchange.

Consider a first "single mouse click" method for sending an order. Clicking a cell in "+" column 411 (buy) or 413 (sell) immediately sends a bid 411 or an ask 413 order to the market. The price of the order is the price in the cell from column 412 that is on the same row as the "+" cell the user has clicked. The volume to be sent when clicking in columns 411 and 413 is shown in text field 403, which is a user-modifiable field where the trader can input any volume desired. This volume can also quickly be set to 0 by pressing button 405. A volume can also be saved as a default order volume for the selected instrument by clicking button 404. After an order has been sent to the exchange, the value in 403 will return to this default value. In this way, the user always knows what volume the user is sending, even when the user is acting quickly.

The row buttons aligned along 406 represent an alternative way of modifying the volume value shown at 403. Pressing any of these buttons sets the value at 403 to the value of the button pressed. Pressing any of these buttons again adds the pressed value to the value shown at 403.

Consider a second "single mouse click" method for sending an order. Column 410 shows the total volume of all buy orders at the exchange with the row price. Clicking a cell in this column sends an ask order with a price equal to the row price and a volume corresponding to the accumulated volume of buy orders at the row price as well as better prices. For example, clicking a cell 422 will send an ask order with a price 10.00 and a volume 1900+1100=3000. Normally, this results in the trader immediately selling 3000 of the financial instrument.

The same action can be performed on the ask side by clicking a cell in column 414. The accumulated volume in column 414 will in the same way be the sum of the market ask orders at the row price and better prices. For example, clicking cell 423 will send a buy order with a price 10.35 and a volume 1200+2100+2100+2300+100=7800. This normally results in the trader immediately buying 7800 of the instrument. Again, the best bid is the highest price, and the best offer is the lowest price.

Another feature allows a user to quickly change "sides" (from buy side to sell side or from sell side to buy side) for an order with a single mouse click at the best price level. In the price column 412, the ask side has a "<" marker at the best price level (407) indicating that when clicked, the traders's own orders at this level will be moved to the left side corresponding to the bid side. Similarly, the bid side has a ">" marker at the best price level. When clicked, the trader's own orders will be moved to the right side, which in this example is the ask side. As shown in FIG. 5, when clicking the "<" cell, the trader's 100 "ask" at the price 10.15 will immediately be updated to a "bid" of 100 at 10.15. An order will thus be moved in the direction as indicated by the arrow in the cell that is clicked, making the display and user input intuitive in order to optimize the speed with which a user can understand a current trading situation and react to it. If market conditions rapidly shift to favor buyers or sellers, the trader can rapidly shift the trader's current position to the favored side.

Figure 7:
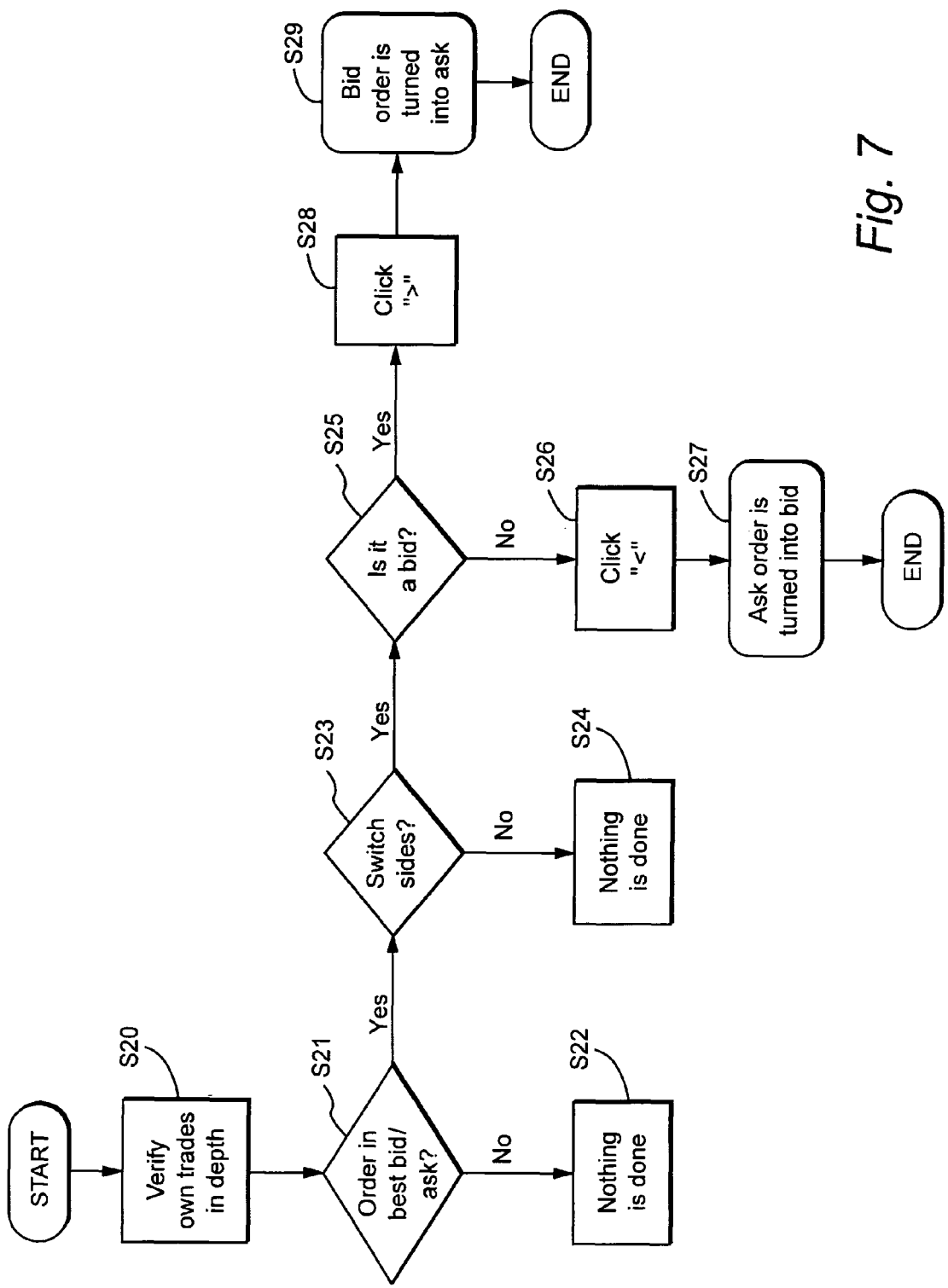
FIG. 7 is a flowchart illustrating example, non-limiting procedures for operating a side switching display.

FIG. 7 is a flowchart illustrating example, non-limiting procedures for implementing a side switch. At step S20, a check is automatically made to retrieve all the orders the trader has for the instrument being traded. A decision is made at step S21 whether the order is for the best bid or best ask price. If not, nothing is done at step S22. If it is, a decision is made whether the user indicates a desire to switch sides at step S23. If not, nothing is done at step S24. If so, a decision is made at step S25 whether the order is a bid order. If not, the user must click on the "<" cell at step S26, after which the ask order is turned into a bid order at step S27. If the order is a bid order, the user must click on the ">" cell at step S28, and the bid order is turned into an ask order at step S29.

Another advantageous feature for quick user action is the capability to permit the user to move prices in the depth display with a single mouse click. FIG. 8 shows one example implementation. Using a mouse, the user moves one or more orders in the depth display to a more attractive price by simply pointing, clicking, dragging across the display, and dropping or unclicking at the attractive price position. In this example identified at 601, the user moves 2 ask orders from the ask price 11.05 to the best ask price 10.85.

Orders may also be withdrawn with a single mouse click. Pressing a cell in column 408 immediately withdraws all the trader's buy orders at the row price, enabling the trader to react quickly when the trader thinks that having any buy order at that specific price is no longer desired. Pressing a cell in column 416 executes the same action for the trader's ask orders at that row price. Two buttons 420 and 421 enable quick withdrawal of all the trader's buy and ask orders. In contrast to clicking columns 408 and 416, which only withdraw orders at the row price, clicking buttons 420 and 421 withdraw all buy and ask orders, respectively.

Having a dynamically moving price column can in certain cases lead to undesired results. If the trader is moving the mouse to click and send an order and the market moves in that moment, there is a risk that the trader will not notice this simultaneous or near simultaneous market movement, and hence, send the order at a price other than the intended one. To prevent this, an additional functionality can be used. Two different example embodiments that do this are described below: an automatic row freezing embodiment and a moving the trading panel on the display screen embodiment.

FIG. 9 shows an example of automatic freezing of a row. The cursor is currently situated in the row corresponding to the price 10.10, and the user is about to press the "+" button to send an order to sell 100 of the financial instrument IBM at price 10.10. The row is automatically frozen as soon as the cursor is situated above the row, and the freezing is indicated by the row being a darker color.

Before the "+" button is pressed, the market moves, and the price column and its associated columns move with it. FIG. 10 displays the display screen immediately after the market has moved. The frozen row is still shown in the same physical place, (in this case, the 5th row from the bottom), and it is still showing the same data as in FIG. 8, with the columns showing the data corresponding to the price 10.10. Clicking the "+" button still sends an order to sell 100 IBM at price 10.10, despite the fact that the market has moved. But without freezing the row, clicking the button would have resulted in an order to sell 100 IBM at price 10.20, since this is the price which would have been the price associated with the row at that moment in time.

The freezing is automatically done as soon as the mouse cursor is positioned above a row in the Dynamic Depth Order display, and in this example, one row is frozen at a time. So moving the mouse cursor from one row to another un-freezes the first row and instead freezes the second row. Moving the mouse cursor away from the display means that no row is frozen. This feature removes the risk of sending an order at an unintended price due to the market moving while the trader is about to send an order.

The trader selects whether to use the auto-freeze functionality depending on personal preferences. Of course, the indicator of a frozen row need not be a darkened area. All that is needed is a clear indicator of the row being frozen. That indicator could be a gray area, a colored or other highlighted frame around the row, or any other type of indicator discernible by the trader.

Figure 11:
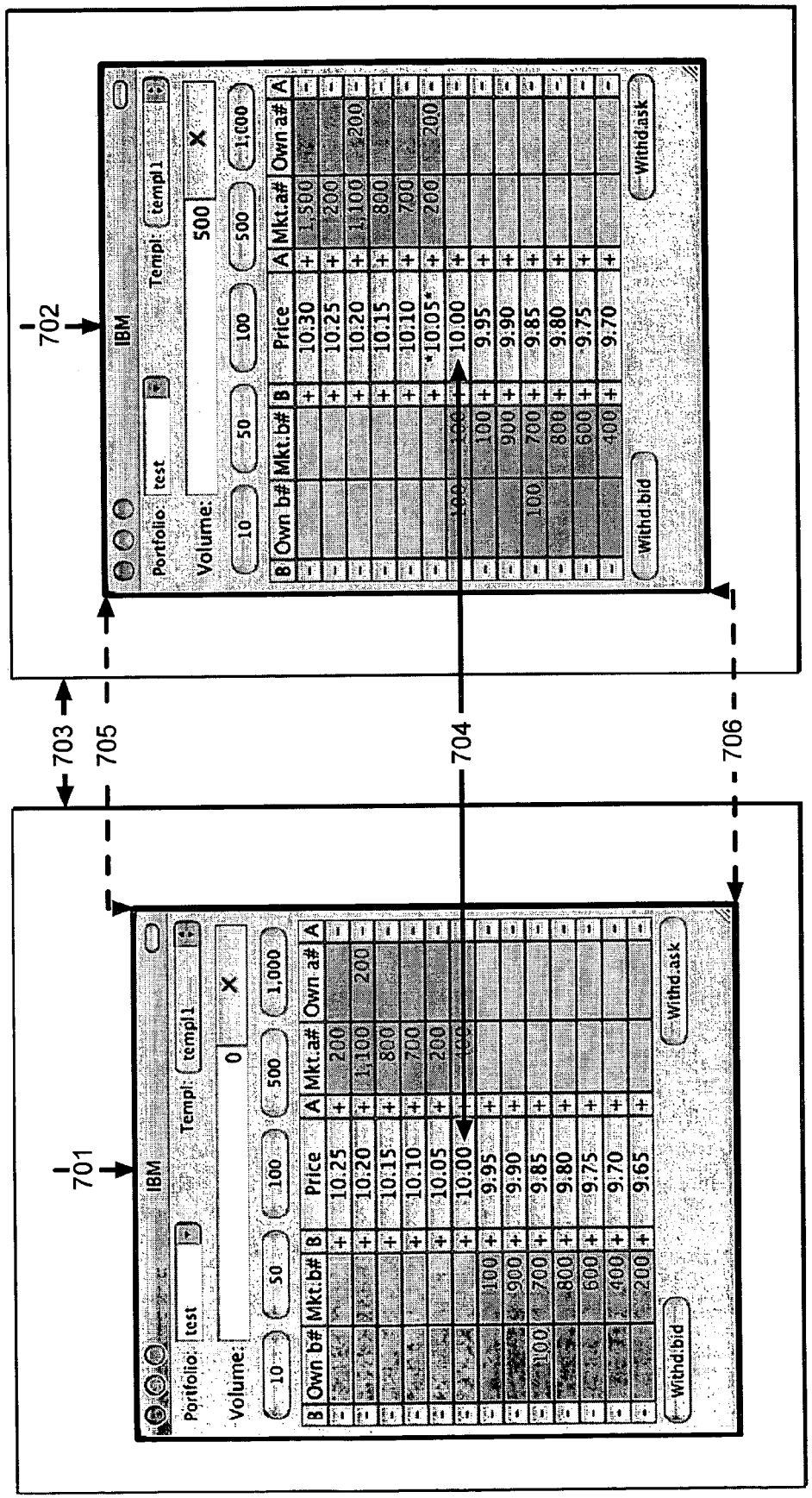
FIG. 11 shows two screen shots where the bid, ask, and prices displays within the trading panel and the position of the trading panel on the display screen both move as the market changes.

An alternative embodiment is to move the trading panel in the display screen with market movements. FIG. 11 illustrates an example of automatically moving the trading panel on the display screen when the market has moved. A trading panel 701 displayed on the display screen 703 includes bid, ask, and price displays for IBM. The bid, ask, and price rows move in the trading panel table with market movement as described above. But in this embodiment, the trading panel 701 also moves to a different position on the display screen 703. The movement of the trading table 701 effectively maintains the position of at least some of the rows in the trading panel table, including the inside market row, at the same physical location on the display screen 703, even though the positions of those rows has moved in the trading panel.

The display screen 701 on the left of the figure shows the positions of the trading panel 701 and the rows in the trading panel 701 before the market moves. The display screen 702 on the right of the figure shows how the trading panel 702 moves on the display screen 703 after the market has moved. The rows have automatically re-centered inside the trading panel 702. But the trading panel itself has also moved up on the display screen 703 as can be seen by the dotted lines 705 and 706. The line 704 illustrates the fact that the row corresponding to the price 10.00 has not moved on the display screen, although that row has moved inside the trading panel due to re-centering of the inside market in the table. Similar movements occur for rows which are present both before and after the market movement, i.e., rows corresponding to the prices 9.70-10.25.

This feature permits at least the central rows appear not to move on the display screen. The fact that all rows which are present both before or after the market movement do not move on the screen ensures that if the trader has started to input an order at a given price and the market then moves, the order will still be sent at the intended price since the row corresponding to the price has not moved on the screen.

The trading panel is essentially a window on the display screen, and the trading table and trading window can be either integral or separate. If integral, moving the trading panel moves the trading window which includes the trading table. If separate, moving the trading panel may move the trading table in the trading window without necessarily moving the trading window (the window may or may not be moved). The trading table moves its position on the display screen after the market movement.

The trader preferably selects whether to use this functionality or not. The trade may also select whether the movement of the trading panel should always occur for any market movement, or whether the movement of the trading panel should occur only when the market moves small amounts. The latter would avoid the trading panel moving up or down the display screen in large "jumps." Additionally, if the trading panel moves all the way to the top or bottom edge of the screen, it will stop moving to avoid it disappearing from the screen. The trader can manually move the panel to a different position in the display screen if desired by clicking and dragging the window. Alternatively, the trading panel can be moved to a different location, such as but not limited to the center of the display screen, automatically when it reaches a display screen boundary, after a certain time period, etc.

Figure 12:
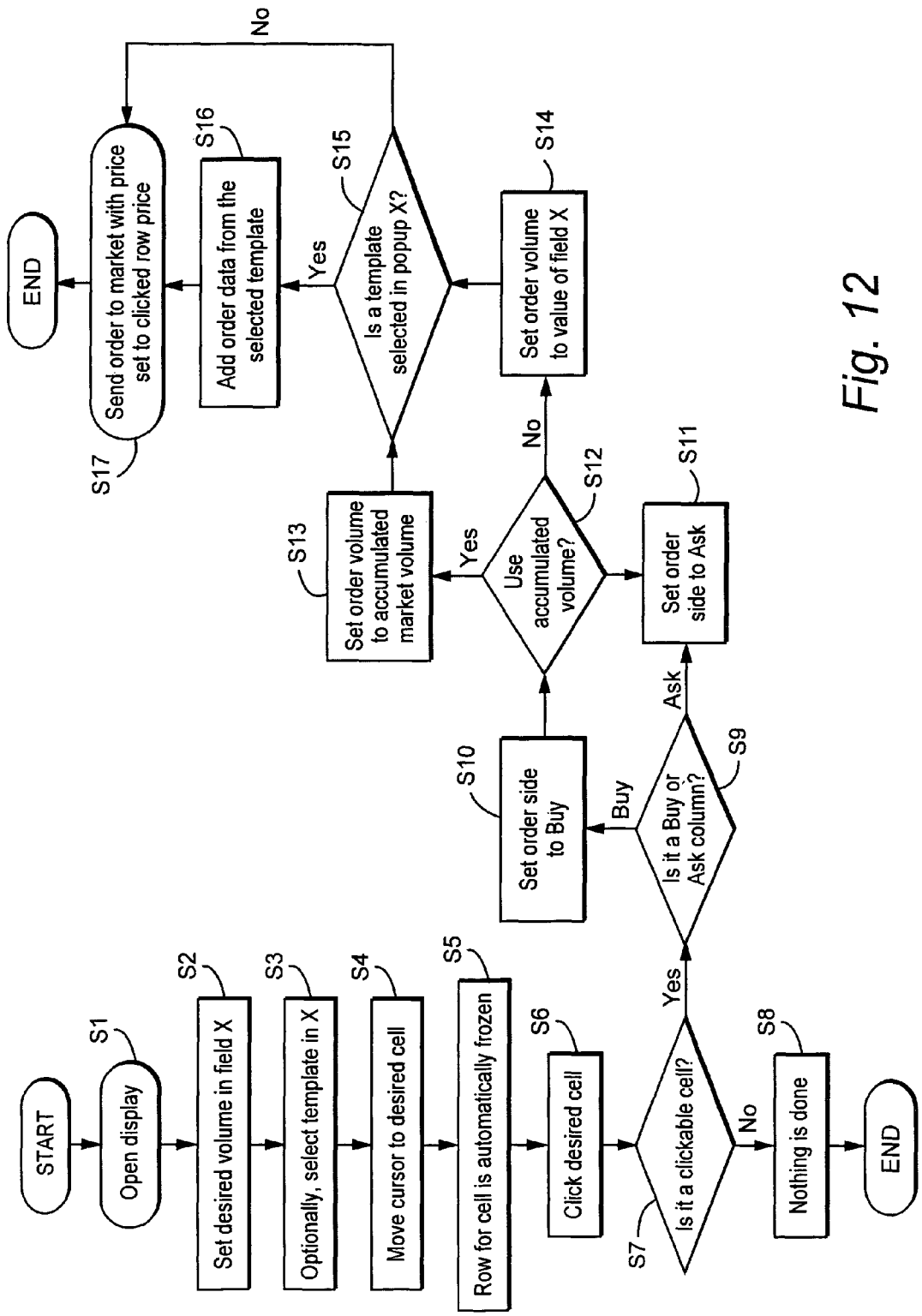
FIG. 12 is a flowchart illustrating example, non-limiting procedures for operating a dynamic depth order display.

FIG. 12 is a flowchart illustrating example, non-limiting procedures for operating the dynamic depth order display. In step S1, the dynamic depth display trading screen is started and displayed. The user may set a desired volume in field X at step S2 or may select a template in field X at step S3. Assuming that a user desires to place a trade, the user moves the cursor to a desired display cell at step S4. The computer detects the cursor in that cell and freezes the cell's row at step S5 (assuming the user has elected to activate the frozen row functionality). The user clicks on the desired cell to place the trade at step S6. A decision is made in step S7 whether the cell is selectable ("clickable"). If not, nothing is done as indicated at step S8. Otherwise, a decision is made whether the cell clicked is in the buy column or the sell column at step S9.

If the clicked cell is in the buy column, the order side (an order side defines whether the order is a buy order or a sell order) is set to buy at step S10. If the clicked cell is in the sell column, the order side is set to sell at step S11. A decision is made at step S12 whether to use accumulated volume. If the cursor is clicked in the market volume column, then the accumulated volume is used at step S13. If the order is a buy order, the sum is of all market orders equal to or higher than the clicked row price. If the order is an ask order, the sum is of all market orders equal to or lower than the clicked row price. Otherwise, if the cursor is clicked in the "+" column, the volume in field X is used at step S14.

At step S15, a decision is made whether a template is selected in popup 402 shown in FIG. 5. If so, the order data is added from the selected template at step S16, and the order is sent to the market with the price set to the clicked row price at step S17. If not, the order is sent to the market with the price set to the clicked row price at step S17.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. It is to be understood that the invention is not to be limited to the disclosed embodiment, but on the contrary, is intended to cover various modifications and equivalent arrangements.

The invention claimed is:

1. A method for placing an order for a financial instrument on an electronic exchange using a computer-implemented graphical user interface that includes a display screen and a user input device that allows the user to interact with the display screen, comprising:
   dynamically displaying by a computer a market depth of the financial instrument including:
     a dynamic display of bids in the market for the financial instrument,
     a dynamic display of asks in the market for the financial instrument, and
     a dynamic display of prices in the market for the financial instrument, wherein the dynamic price display is interposed between or adjacent to one of the dynamic bid display and the dynamic ask display;
   moving information by the computer within each of the dynamic displays with changes in the market for the financial instrument;
   selecting by the user input device to select a region of one of the dynamic displays, the selected region including a bid volume or an ask volume and a corresponding price, the computer temporarily freezing movement of the selected region of the dynamic displays as long as the selected region remains selected, even though a market change causes the computer to move unselected portions of the dynamic displays; and
   entering by the user device to enter an order for the financial instrument at a price displayed in or associated with the selected region, the computer providing the entered order for transmission to the electronic exchange.

2. The method in claim 1, wherein the selected region is a row including a bid or an ask and a price, and wherein the freezing step further includes maintaining display of quantity and price values associated with the selected region even though the market for the financial instrument may have changed.

3. The method in claim 2, wherein the entry of the order command in the selected region results in sending the entered order to the electronic exchange at the maintained quantity and price value of the selected region even though the market for the financial instrument may have changed.

4. The method in claim 1, wherein the entered order is a buy order if the position of the selected row at the time of actuation is within a bid order entry region and wherein the entered order is a sell order if the selected row at the time of actuation is within an ask order entry region, the method further comprising displaying a side switch indicator at a price level on one of the bid and ask dynamic displays which when selected and actuated by the user device causes a selected user trade order to be switched to the price level on the other of the bid and ask dynamic displays.

5. The method in claim 1, further comprising:
   selecting with the user device a region in the dynamic display to configure a first order at a first price;
   moving with the user device the first order to a different display region associated with a second price to configure a second order; and
   entering the second order.

6. The method in claim 5, wherein the user device is a mouse, the selecting includes using a mouse to point to the selected region, the configuring includes clicking the mouse at the selected region, and the moving and entering are performing by dragging the first order to the different display region and unclicking the mouse.

7. The method in claim 1, wherein the user device is a mouse configured in used to permit the user to move a pointer to different locations on the display screen, the selecting includes using the mouse to move the cursor over the selected region, and the actuating includes clicking the mouse when the cursor is over the selected region, the method further comprising:
   withdrawing all bid orders by selecting, using the user device, an area of the display configured as a withdraw bid region and actuating the user device, and
   withdrawing all ask orders by selecting, using the user device, an area of the display configured as a withdraw ask region and actuating the user device.

8. The method in claim 1, wherein the dynamic bid display, dynamic ask display, and dynamic price display have a different display characteristic to facilitate visual distinction, and wherein the best price is highlighted on the display.

9. The method in claim 1, further comprising:
   providing a template display region permitting selection of a template using the user device,
   automatically including information in the order based on a selected template.

10. A computer readable medium having program code recorded thereon for execution on a computer having a graphical user interface including a display screen and a user input device useable to place an order for a financial instrument on an electronic exchange, comprising:
   first program code when executed by the computer for dynamically displaying a market depth of the financial instrument including:
     a dynamic display of bids in the market for the financial instrument,
     a dynamic display of asks in the market for the financial instrument, and
     a dynamic display of prices in the market for the financial instrument,
   wherein the dynamic price display is interposed between or adjacent to one of the dynamic bid display and the dynamic ask display, and
   first program code, when executed by the computer, for moving information within each of the dynamic displays with changes in the market for the financial instrument;

when a user uses the user input device to select a region of one of the dynamic displays, the selected region including a bid volume or an ask volume and a corresponding price, second program code, when executed by the computer, temporarily freezes movement of the selected region of the dynamic displays as long as the selected region remains selected, even though a market change causes the computer to move unselected portions of the dynamic displays; and when the user actuates the user device to enter an order for the financial instrument at a price displayed in or associated with the selected region, third program code, when executed by the computer, provides the entered order for transmission to the electronic exchange.

11. The computer readable medium in claim 10, further comprising program code for maintaining display of quantity and price values associated with the selected region even though the market for the financial instrument may have changed, and program code for sending the entered order to the electronic exchange at the maintained quantity and price value of the selected region even though the market for the financial instrument may have changed.

12. The computer readable medium in claim 10, wherein the entered order is a buy order if the position of the selected region at the time of actuation is within a bid order entry region and wherein the entered order is a sell order if the selected region at the time of actuation is within an ask order entry region, the computer readable medium further comprising program code for displaying a side switch indicator at a price level on one of the bid and ask dynamic displays which when selected and actuated by the user device causes a selected user order to be switched to the price level on the other of the bid and ask dynamic displays.

13. The computer readable medium in claim 10, wherein when the user device selects a region in the dynamic display to configure a first order at a first price and the user device moves the first order to a different display region associated with a second price to configure a second order, program code is configured to enter the second order.

14. The computer readable medium in claim 10, further comprising program code for:

withdrawing all bid orders in an area of the display configured as a withdraw bid region selected by the user device, and withdrawing all ask orders in an area of the display configured as a withdraw ask region selected by the user device.

15. The computer readable medium in claim 10, further comprising program code for:

providing a template display region permitting selection of a template using the user device, automatically including information in the order based on a selected template.

16. A client system for placing an order for a financial instrument on an electronic market using a graphical user interface, comprising:

a display screen, a user input device that allows the user to interact with the display screen, a computer configured to control the display in accordance with inputs from the user input device to dynamically display a market depth of the financial instrument including:

a dynamic display of bids in the market for the financial instrument, a dynamic display of asks in the market for the financial instrument, and a dynamic display of prices in the market for the financial instrument, wherein the dynamic price display is interposed between or adjacent to one of the dynamic bid display and the dynamic ask display, wherein the computer is configured to;

move information within each of the dynamic displays with changes in the market for the financial instrument, and when a user uses the user input device to select a region of one of the dynamic displays, the selected region including a bid volume or an ask volume and a correspondence price, temporarily freeze movement of the selected region of the dynamic displays as long as the selected region remains selected, even though a market change causes the computer to move unselected portions of the dynamic displays; and when the user actuates the device to enter an order for the financial instrument at a price displayed in or associated with the selected region, provide the entered order to the electronic market.

17. The client system in claim 16, wherein the computer is further configured to maintain display of quantity and price values associated with the selected region even though the market for financial instrument has changed.

18. The client system in claim 16, wherein in response to the entry of the order command in the selected region, the computer is configured to send the entered order to the electronic market at the maintained quantity and price value of the selected region even though the market for the financial instrument may have changed.

19. The client system in claim 16, wherein the entered order is a buy order if the position of the selected region at the time of actuation is within a bid order entry region, wherein the entered order is a sell order if the selected region at the time of actuation is within an ask order entry region, and wherein the computer is configured to display on the display screen a side switch indicator at a price level on one of the bid and ask dynamic displays, which when selected and actuated by the user device causes the computer to switch a selected user order to the price level on the other of the bid and ask dynamic displays.

20. The client system in claim 16, wherein the computer is configured to:

receive from the user device a selected region in the dynamic display and configure a first order at a first price;

move the first order to a different display region associated with a second price to configure a second order in response to movement of the user device from the selected region to a new region in the dynamic displays; and enter the second order.

21. The client system in claim 20, wherein the user device is a mouse configured in use to permit the user to point to the selected region, click the mouse at the selected region, and drag the first order to the different display region and unclick the mouse.

22. The client system in claim 16, wherein the user device is a mouse configured in use to permit the user to move a pointer to different locations on the display screen, move the cursor over the selected region, and click the mouse when the cursor is over the selected region.

23. The client system in claim 16, wherein the computer is configured to:
   withdraw all bid orders in response to the user device selecting an area of the display configured as a withdraw bid region, and
   withdraw all ask orders in response to the user device selecting an area of the display configured as a withdraw ask region.

24. The client system in claim 16, wherein the dynamic bid display, dynamic ask display, and dynamic price display are have a different display characteristic to facilitate visual distinction, and wherein the best price is highlighted on the display.

25. The client system in claim 16, wherein the computer is configured to provide a template display region permitting selection of a template by the user device, causing the computer to automatically include information in the order based on a selected template.

* * * * *